United States Patent
Lahtinen

(10) Patent No.: US 6,768,895 B2
(45) Date of Patent: Jul. 27, 2004

(54) METHOD AND SYSTEM FOR THE CONTROL OF VOTING BY TELEPHONE

(75) Inventor: Pasi Lahtinen, London (GB)

(73) Assignee: Sonera Oyj, Helsinki (FI)

( * ) Notice: Subject to any disclaimer, the term of this patent is extended or adjusted under 35 U.S.C. 154(b) by 469 days.

(21) Appl. No.: 09/740,161

(22) Filed: Dec. 18, 2000

(65) Prior Publication Data

US 2001/0005670 A1 Jun. 28, 2001

(30) Foreign Application Priority Data

Jun. 16, 1998 (FI) .................................................. 981399
Jun. 11, 1999 (WO) .............................. PCT/FI99/00512

(51) Int. Cl.[7] ........................... H04B 17/00; H04H 9/00
(52) U.S. Cl. .................... 455/2.01; 455/3.03; 455/466; 455/517
(58) Field of Search ............................ 455/2.01, 3.03, 455/3.05, 434, 435.1, 8, 9, 67.11, 67.7, 68, 517, 507, 515, 520, 17, 422, 466, 458

(56) References Cited

U.S. PATENT DOCUMENTS

| | | | |
|---|---|---|---|
| 4,290,141 A | | 9/1981 | Anderson et al. |
| 5,719,619 A | * | 2/1998 | Hattori et al. ................. 725/24 |
| 5,838,774 A | * | 11/1998 | Weisser, Jr. .............. 379/92.02 |
| 5,867,491 A | * | 2/1999 | Derango et al. ............. 455/450 |
| 6,381,466 B1 | * | 4/2002 | Sarallo et al. ............... 455/517 |
| 6,522,877 B1 | * | 2/2003 | Lietsalmi et al. ........ 455/422.1 |

FOREIGN PATENT DOCUMENTS

| EP | 0 600 567 A1 | 6/1964 |
|---|---|---|
| EP | 0 917 333 A1 | 5/1999 |
| WO | WO 98/10604 | 3/1998 |

* cited by examiner

*Primary Examiner*—Nick Corsaro
*Assistant Examiner*—John J Lee
(74) *Attorney, Agent, or Firm*—Cohen, Pontani, Lieberman & Pavane

(57) ABSTRACT

A system and method for controlling telephone voting in a digital mobile communication network that includes a plurality of mobile subscriber communication stations provides for automated, statistically-appropriate control of telephonic voting via such mobile stations. Using a polling server, a predetermined initial proportion of the mobile stations is authorized to concurrently transmit a vote by transmitting a voting authorization to the authorized mobile stations over a control channel from the polling server. A voting application stored in or associated with each mobile station monitors the control channel and enables transmission of a vote from a mobile station only after the authorization has been received by that mobile station. The invention thereby accommodates and assures the staggered transmission of votes in a telephonic poll so as to avoid overloading of the network.

10 Claims, 1 Drawing Sheet

METHOD AND SYSTEM FOR THE CONTROL OF VOTING BY TELEPHONE

BACKGROUND OF THE INVENTION

1. Field of the Invention

The present invention relates to a method and system for the control of telephonic voting, and more particularly for telephonic voting using mobile stations in a digital mobile communication network.

2. Description of Related Art

Traditionally, a problem with voting by telephone in the conduct of a vote or poll has been congestion of the network. Thus, when the telephone numbers used to receive the users' votes are publicized or announced in a radio or television broadcast, a large number of people attempt to call those numbers at the same time, thereby overloading the network. The only heretofore-known attempted solution to this problem has been efforts to design such programs so that the vote-transmitting phone calls are not all received at the same time but, rather, as a steadier load.

SUMMARY OF THE INVENTION

It is therefore the desideratum of the present invention to provide a method and system that eliminates, or at least substantially overcomes or reduces, the drawbacks and deficiencies of the prior art as for example hereinabove described.

It is a particular object of the invention to provide a method and system for predeterminately staggering the sending or transmission of votes in a telephonically-conducted poll or vote that is carried out using mobile telephones or communication stations to thereby avoid overloading of the network.

The system of the invention for controlling telephonic voting in a digital mobile communication network that includes one or more mobile stations provides for advantageous control of the telephonic voting being carried out using the mobile stations. In accordance with the invention, the system comprises a polling server which is used to perform calculations regarding the statistical reliability of the voting, on the basis of which a certain proportion of the mobile stations is authorized at any given time to concurrently transmit votes. The reliability of the voting and the proportion of mobile stations so authorized are therefore statistically defined. If, for example, during a first polling round every hundredth mobile station number is authorized to send a vote and only 100 votes are received, then in the next round every tenth mobile station may be authorized to send a vote, as a consequence of which it is anticipated that another 1000 votes are likely to be received. Once about 2000 votes or 20% of the total number of votes have been received, the voting result is statistically correct with an accuracy of 0.1 to 0.5%.

The inventive system further includes a control channel which is used to transmit a voting authorization from the polling server to mobile stations which are to thereby be authorized to send a vote, and a voting application that is used by the mobile station to monitor messages transmitted in the control channel and to send a vote after the authorization has been received. The voting application is thus implemented in conjunction with the mobile stations, and may for example be stored on a Subscriber Identity Module (SIM) that is associated with a particular mobile station.

As contrasted with the prior art, the present invention advantageously provides for staggered transmission of votes in telephonic polling via mobile stations, thereby obviating overloading of the network. The results of the voting can moreover be predicted with enhanced statistical reliability, even if for example only ten percent of the votes are actually sent to the polling server and the rest not sent at all. The voting activities can be controlled and limited to a very narrow range of time while nevertheless accommodating a large number of voters since the control of the service is with the polling server.

In one or more embodiments of the invention, a variety of features may be individually or variously collectively implemented. For example, the control channel may be a Cell Broadcast channel. In addition, the voting authorization may be provided using a predetermined protocol. The vote may moreover be transmitted from the mobile station via an SMS (Short Message Service) message, a USSD (Unstructured Supplementary Service Data) message, or other like or corresponding message or signal or transmission. The mobile communication network may be a GSM (Global System for Mobile communications) network or other digital mobile communication network.

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims.

BRIEF DESCRIPTION OF THE DRAWING

The single drawing FIGURE is a block diagram diagrammatically illustrating a digital mobile communication system implementing a preferred embodiment of the present invention.

DETAILED DESCRIPTION OF THE CURRENTLY PREFERRED EMBODIMENTS

Figure 1:
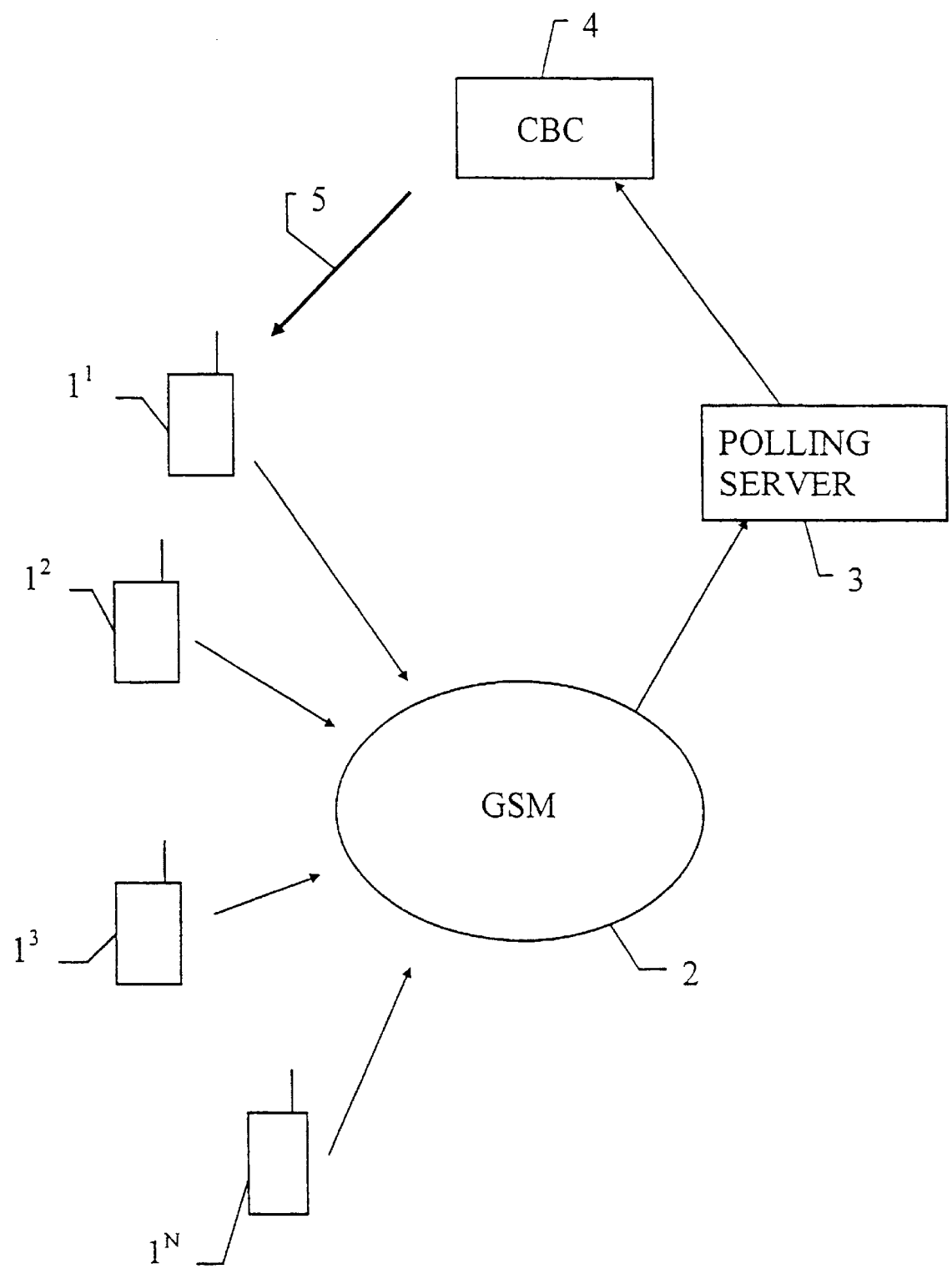

In accordance with the invention, and with reference for ease of explanation to the drawing FIGURE, a polling server 3, implemented by way of example using a computer workstation, is connected to a GSM (Global System for Mobile communications) digital mobile telecommunication network 2. The polling server 3 is additionally connected to a Cell Broadcast Center (CBC) 4 for communicating with a plurality of mobile stations $1^N$ which are maintained and/or utilized by subscribers to the network for communications and, in accordance with the invention, for transmission therefrom of subscriber-specified votes.

The preferred method and system for providing control of a voting event proceeds as follows. Using the polling server 3, at first (i.e. at the start, or in the first round, of voting) only a predetermined proportion of the total user or subscriber base, by way of illustrative example every hundredth user, is authorized to concurrently send or transmit a vote to the polling server. Each vote may for example be sent from a respective one of the authorized mobile stations $1^1$, $1^2$, . . . $1^N$ in the form of an SMS short message, a USSD message, or as some other type or form of data. The authorization or authority is implemented using a predetermined protocol, and the authorization is transmitted using a predetermined CB (Cell Broadcast) channel 5 that is used as a control channel by the cell broadcast center 4. Using a voting application implemented in connection with the GSM stations or telephones $1^1$, $1^2$, . . . $1^N$—as for example as a software-defined or based program that is stored in the mobile telephones or in the SIM (Subscriber Identification Module) cards of the mobile telephones—the predetermined CB channel 5 is monitored to receive and recognize any messages transmitted in the channel and thereby enable and permit transmission of a vote from the mobile station only after the proper authorization has been received by that mobile station.

The polling server 3 controls the predetermined CB channel 5 and performs calculations to determine the statistical reliability of the poll. If for example the first round yields only a hundred votes, then for the next round the polling server might authorize every tenth mobile station to transmit a vote, which would be anticipated to likely result in the receipt of a thousand more votes. Selection of the particular mobile stations to be authorized can be made on any appropriate basis, as for example on the basis of a range of numbers or a user group. Authorizations to vote continue to be granted to mobile stations until all subscribers have been authorized and all votes have been gathered. When about 2000 votes or 20% of the total number have been received, the result of the poll is statistically correct with an accuracy of 0.1 to 0.5%. Thus, an accurate forecast of the outcome of the vote can be obtained relatively soon after the beginning of polling.

While there have shown and described and pointed out fundamental novel features of the invention as applied to preferred embodiments thereof, it will be understood that various omissions and substitutions and changes in the form and details of the methods described and systems and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for controlling telephonic voting in a digital mobile communication network that includes a plurality of mobile stations through which voting is carried out from the mobile stations, comprising the steps of:

calculating, by a polling server connected to the network, a statistical reliability of the telephonic voting, and determining from the calculated statistical reliability a proportion of the plural mobile stations to be concurrently authorized to transmit a vote to the polling server;

transmitting, from the polling server over a predetermined control channel, a voting authorization to the mobile stations in said determined proportion of the plural mobile stations, wherein the statistical reliability is calculated before said step of transmitting the voting authorization, such that the authorization of the mobile stations in said predetermined proportion of the plural mobile stations is based on the determined statistical reliability; and using a voting application of the plural mobile stations, monitoring the predetermined control channel and enabling transmission of a vote from an authorized mobile station when the voting authorization is received by the authorized mobile station as determined by the channel-monitoring voting application.

2. A method in accordance with claim 1, wherein the predetermined control channel is a Cell Broadcast channel.

3. A method in accordance with claim 1, wherein the transmitted voting authorization is provided using a predetermined protocol.

4. A method in accordance with claim 1, further comprising the step of transmitting, from an authorized mobile station, a vote as one of a Short Message Service message and an Unstructured Supplementary Service Data message.

5. A method in accordance with claim 1, wherein the digital mobile communication network comprises a GSM network.

6. A system for controlling telephonic voting in a digital mobile communication network that includes a plurality of mobile stations through which voting is carried out from the mobile stations, comprising:

a polling server connected to the network for calculating a statistical reliability of the telephonic voting and for determining, from the calculated statistical reliability, a proportion of the plural mobile stations to be concurrently authorized to transmit a vote to the polling server;

a control channel for transmitting a voting authorization to the mobile stations in said determined proportion of the plural mobile stations, wherein the statistical reliability is calculated before the transmission of the voting authorization to the plural mobile stations in said determined proportion of the plural mobile stations, such that the authorization of said determined proportion of the plural mobile stations is based on the statistical reliability; and a voting application of the plural mobile stations for monitoring the control channel and enabling transmission of a vote from an authorized mobile station when the voting authorization has been received by the authorized mobile station as determined by the channel-monitoring voting application.

7. A system in accordance with claim 6, wherein the control channel comprises a Cell Broadcast channel.

8. A system in accordance with claim 6, wherein the transmitted voting authorization is provided using a predetermined protocol.

9. A system in accordance with claim 6, wherein a vote is transmitted from an authorized mobile station using one of a Short Message Service message and an Unstructured Supplementary Service Data message.

10. A system in accordance with claim 6, wherein the digital mobile communication network comprises a GSM network.

* * * * *

UNITED STATES PATENT AND TRADEMARK OFFICE
CERTIFICATE OF CORRECTION

PATENT NO. : 6,768,895 B2  
APPLICATION NO. : 09/740161  
DATED : July 27, 2004  
INVENTOR(S) : Pasi Lahtinen It is certified that error appears in the above-identified patent and that said Letters Patent is hereby corrected as shown below:

Please add the following statement to Col. 1, line 5, before the heading "BACKGROUND OF THE INVENTION":

--This is a continuation of PCT Application No. PCT/FI99/00512, filed on June 11, 1999, which claims priority from Finland Application No. 981399, filed June 16, 1998.--

Please replace the foreign application priority data on the cover page with the following:

--(30) Foreign Application Priority Data

June 16, 1998 (FI)                             981399--

Please add the following to the cover page:

--(63)         Continuation Data

This application is a continuation of PCT/FI99/00512, filed on June 11, 1999.--

Signed and Sealed this

Twenty-fifth Day of July, 2006

JON W. DUDAS  
*Director of the United States Patent and Trademark Office*